[19] United States Patent
Conrad

[11] 4,140,413
[45] Feb. 20, 1979

[54] HUB-LOCKING DEVICE
[75] Inventor: René A. Conrad, Woodside, Calif.
[73] Assignee: Dynaloc Corporation, San Mateo, Calif.
[21] Appl. No.: 801,164
[22] Filed: May 27, 1977
[51] Int. Cl.² .............................................. F16B 7/04
[52] U.S. Cl. .......................................... 403/370; 64/4; 74/230.4; 279/16; 308/29; 403/90; 403/131; 403/371
[58] Field of Search ................. 403/370, 371, 131, 90, 403/122, 356; 74/230.4; 308/29, 72, 194; 64/4, 30 E, 30 R; 279/1 L, 16, 50

[56] References Cited
U.S. PATENT DOCUMENTS

| 2,404,385 | 7/1946 | Fritts | 279/50 |
| 2,431,476 | 11/1947 | Hall | 279/16 |
| 3,009,747 | 11/1961 | Pitzer | 403/240 X |
| 3,627,339 | 12/1971 | Burweger | 403/370 X |
| 3,905,209 | 9/1975 | Conrad | 64/1 JR |

Primary Examiner—Price C. Faw, Jr.
Assistant Examiner—Conrad L. Berman
Attorney, Agent, or Firm—Schatzel & Hamrick

[57] ABSTRACT

An improved hub-locking device for conveyor pulleys including a spherically shaped collet having a centrally located bore for receiving a shaft and having an axially aligned slot extending through one side thereof permitting compression of the collet on the shaft, a hub attached to the end of the pulley and having an axially aligned tapered aperture for partially receiving the collet with the shaft therein, a clamping ring having a tapered aperture for partially fitting over the collet and a plurality of bolts for passing through holes in the clamping ring, for threading into the hub and for drawing the clamping ring toward the hub compressing the collet therebetween, causing the collet to compress and engage the shaft, the hub and the clamping ring.

8 Claims, 3 Drawing Figures

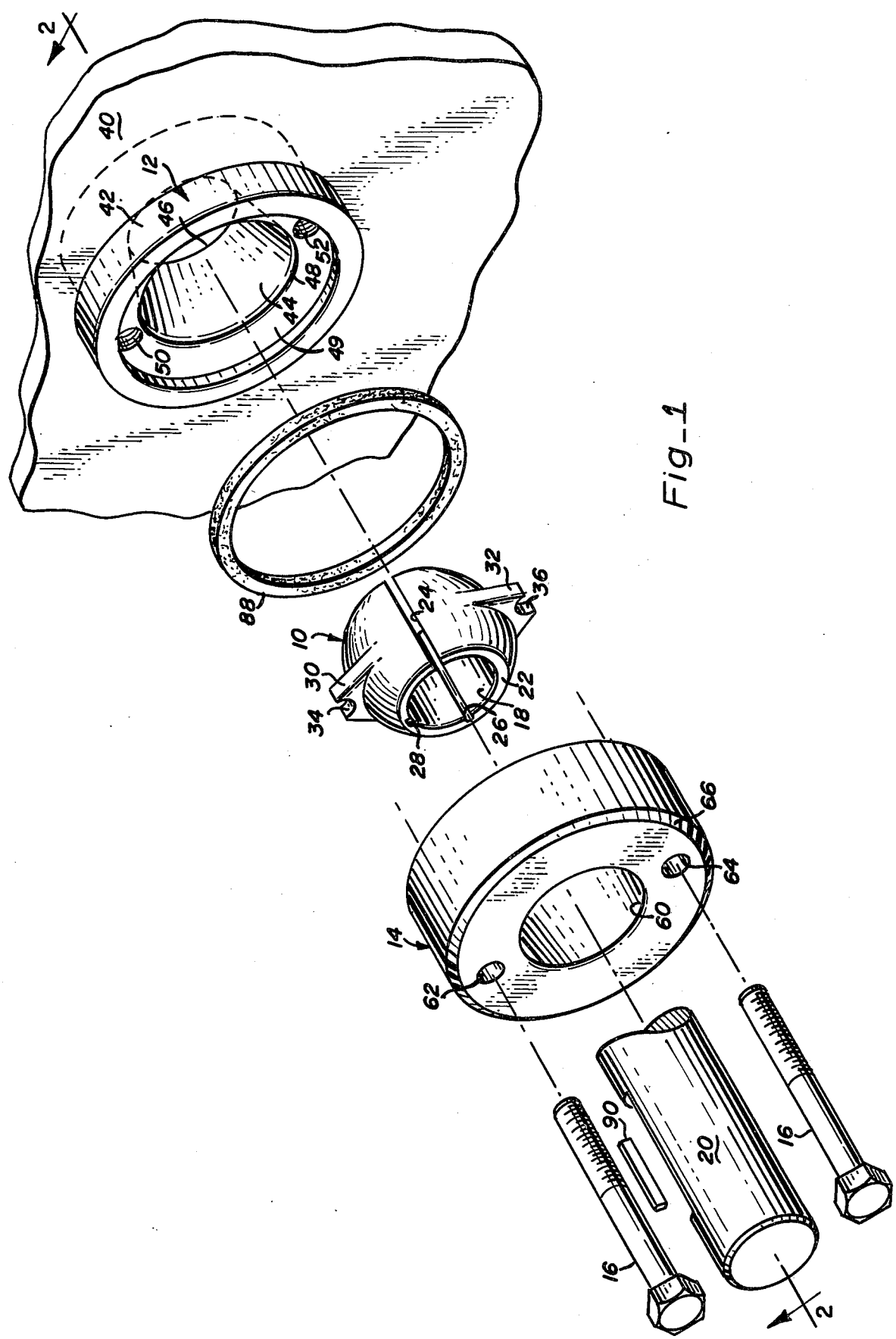
Fig_1

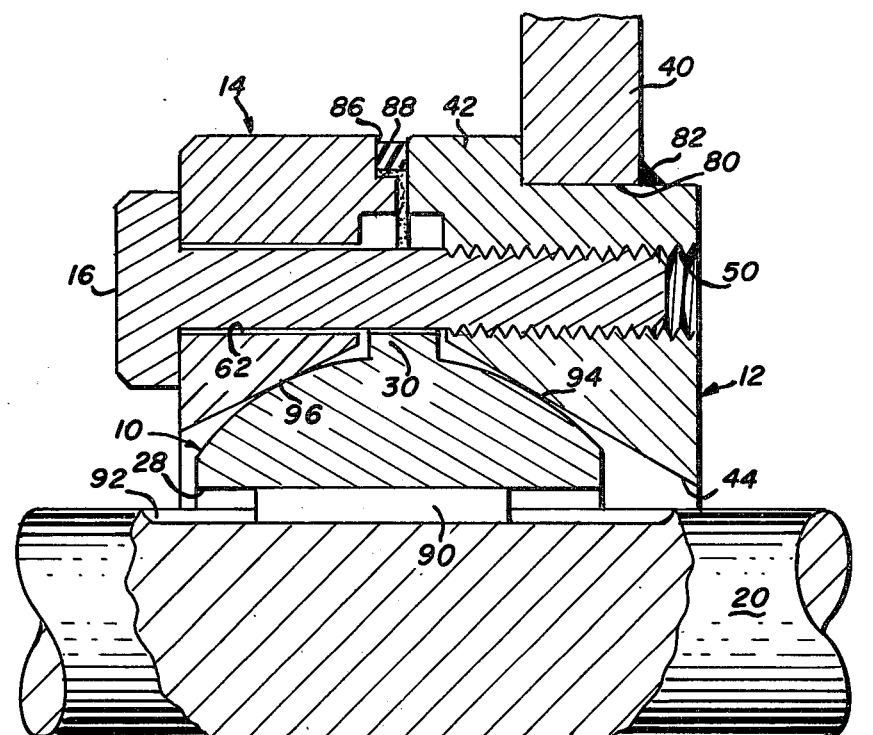
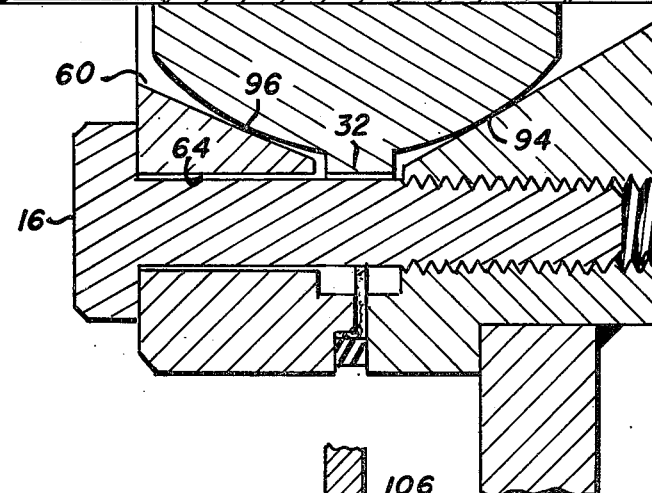
Fig_2
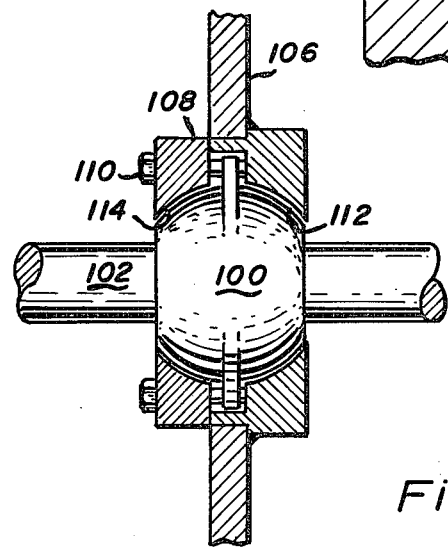
Fig_3

HUB-LOCKING DEVICE

BACKGROUND OF THE INVENTION

1. Field of the Invention

The present invention relates generally to apparatus for coaxially mounting a cylindrical body to a rotatable shaft and more particularly to compression coupling apparatus for securely affixing a conveyor pulley to a rotatable shaft in which the shaft and/or pulley endplate need not be in perfect alignment.

2. Description of the Prior Art

Mounting of pulleys on rotatable shafts has presented universal problems. Of corse, welding the pulley to the shaft is one of the simplest mounting methods. Removal of the shaft, however, is impractical and if care is not exercised in the welding, misalignment can occur. Another prior art device uses keys and set screws. Keyways are cut in each of the pulley endplates. Following insertion of the shaft and keys, two pair of set screws are threaded into the endplates. The first pair of set screws engage the keys and the second pair engage the shaft. A major problem with this device is that a high degree of accuracy is required in the installation of the endplates such that the keyways are aligned and the bores are coaxial. Any misalignment of the keyways makes installation of the keys much more difficult or impossible. (This problem can be aggravated by keyway misalignment in the shaft.) If the bores are not perfectly coaxial, bending of the shaft will result, causing vibration, fatigue of the bearings, and the associated parts, and increasing run out. In addition, the set screws mark the shaft and are ineffective in preventing lateral movement, or creeping of the pulley on the shaft.

Another prior art device of mounting a pulley to a rotatable shaft uses a pair of frustum-shaped collets. Each collet is bored axially to accommodate the shaft and is slotted, permitting the collet to be compressed around the shaft to prevent creeping of the pulley along the shaft. The collet and shaft also contain keyways designed to accept a key which prevents rotation of the shaft in the collet. Each of the pulley endplates contain a tapered bore converging toward the center of the pulley, the tapered bore being designed to mate with the collet along its entire tapered surface. Along the juncture of the collet and the endplate are a number of threaded mounting holes. The holes are bored into the endplate deeper than the collet and are threaded in the endplate only.

After the shaft is inserted into the pulley, the key and collet are installed on the shaft and the collet pressed into the endplate, the mounting bolts are threaded into the mounting holes. The bolt threads engage the endplate threads, and the bolt ends seat against the bottom of the bores in the collet. Finally, the collet is struck (such as with a hammer and drift punch) while the bolts are tightened.

It should be appreciated that if the endplates are misaligned with respect to the shaft, the collet will at first mate with the endplate at only two points, which provides insufficient compression to prevent creeping of the pulley along the shaft. If the bolts are tightened further, the collet will be forced into alignment bending the shaft, which can cause run out at the pulley face or shaft breakage. Additionally, keyway alignment is still critical in this device. Thus, although this hub mounting device greatly reduces creeping of the pulley along the shaft, it does not prevent the vibration and fatigue caused by bending of the shaft.

A different device for coaxially mounting a pulley to a shaft is disclosed in my earlier U.S. Pat. No. 3,905,209, entitled "Compression Hub Apparatus for Mounting a Cylindrical Body to a Rotatable Shaft." Attached to each end of the pulley is an endplate having a first bore axially aligned with the pulley of suitable diameter for receiving the shaft. A second, larger diameter bore, coaxial with the first, extends a short distance into each endplate forming cylindrical recesses. Each recess is enclosed by a coverplate attached by suitable bolts.

In a first embodiment, a plurality of compressible cup-shaped discs, each having a diameter corresponding to the diameter of the recess and a bore suitable for fitting over the shaft are disposed within each cavity. As the bolts mounting the coverplate are tightened the coverplate is drawn toward the endplate deforming the discs which are thus caused to engage both the shaft and the walls of the cavity locking the pulley to the shaft.

In another embodiment the locking device resembles an oblique helicoid having a cross section similar to a parallelogram with the shorter sides paralleled to the axis of the helicoid forming a shaft gripping inner surface and a cavity gripping peripheral surface. The helicoid is similarly deformed within the cavity by the coverplate.

SUMMARY OF THE PRESENT INVENTION

It is therefore an object of the present invention to provide a hub-locking device which does not require close tolerances.

Another object is to provide a hub-locking device which is easy to assemble and does not require striking.

Still another object of the present invention is to eliminate shaft bending caused by mounting of the pulley to the shaft.

Briefly, the preferred embodiment includes a spherically shaped collet having a centrally located bore for receiving a shaft and having a slot extending through one side thereof permitting compression of the collet on the shaft, a hub attached to the end of a pulley and having an axially aligned tapered bore for receiving the shaft and collet, a clamping ring having a tapered bore for fitting over the collet and a plurality of bolts for passing through holes in the clamping ring and threading into the hub for drawing the clamping ring toward the hub and compressing the collet therebetween, causing engagement of the shaft, hub, and clamping ring.

it is therefore a material advantage of the present invention to provide a hub-locking device which reduces or eliminates run out, vibration and fatigue.

Another advantage of the hub-locking device is its positive coupling preventing creeping of the pulley on the shaft.

An additional advantage of the present invention is the ability to seal the pulley.

These and other objects and advantages of the present invention will no doubt become apparent to those of ordinary skill in the art after having read the following detailed description of the preferred embodiment illustrated in the several figures of the drawing.

IN THE DRAWING

FIG. 1 is an exploded perspective view showing a hub-locking device in accordance with the present invention;

FIG. 2 is a cross section taken along the line 2—2 of FIG. 1; and

FIG. 3 is a partial cross section view illustrating an alternative embodiment of the hub-locking device.

DETAILED DESCRIPTION OF THE PREFERRED EMBODIMENT

Referring to FIG. 1, the preferred embodiment of a hub-locking device is shown generally to include a collet 10 a hub 12, a clamping ring 14, and two mounting bolts 16. The collet has a substantially spherical shape and contains a centrally located bore 18 of a size slightly larger than the shaft 20 which it is designed to clamp. At either end of the bore, the collet is truncated, as shown at 22. Axially aligned with the bore and extending through one side of the collet is a first slot 24 of width designed to permit sufficient compression of the collet as is necessary to compressingly engage the shaft. The first slot is relieved by a second shallow slot 26, which lies opposite the first slot and is aligned therewith.

In the preferred embodiment an axially aligned keyway 28 extends along the bore through the collet, and two mounting ears, or lugs, 30 and 32 are located at two diametrically opposite positions along the surface of the collet. The lugs lie within an imaginary plane which passes through the center of the collet and which is aligned perpendicular to the bore. The lugs extend outward from the collet to form two semicircular mounting recesses or bores, 34 and 36 of diameter somewhat larger than that of bolts 16. The mounting bores are axially aligned with bore 18.

Hub 12 is generally disc-shaped to fit partially within a similar sized bore in the center of the pulley endplate 40. The front of the hub is flanged at 42 to seat against the front of the endplate for alignment. The hub contains an axially aligned cone-shaped aperture 44 which flares from a first diameter at the rear surface 46, slightly larger than the shaft diameter, to a second diameter at 48, slightly greater than the diameter of the spherical portion of the collet. The hub is counter sunk at 49 to accommodate the lugs 30 and 32 of the collet. At diametrically opposite points, the hub contains two tapped bores 50 and 52, suitable for receiving bolts 16, which have similar spacing as that of the mounting bores in the collet.

In the preferred embodiment, the threads are of a locking type such as those known as Spiralock threads cut with a tap manufactured by Detroit Tap and Tool Company. Alternatively, regular threads may also be employed by using suitable locking washers with the mounting bolts.

Clamping ring 14 is of generally cylindrical shape, having a diameter similar to the diameter of flange 42 of the hub. The ring contains an axially aligned cone-shaped aperture 60, only the front of which is visible in this figure. The aperture flairs from a first smaller radius in the front, which is larger than the radius of bore 18 plus the depth of keyway 28 in the collet. The ring contains two diametrically spaced bores 62 and 64, spaced apart a distance similar to the spacing of mounting bores 34 and 36 in the collet. The bores are of a diameter suitable for accepting mounting bolts 16. The bores may optionally be counter bored. The front periphery is chamfered at 66.

In the preferred embodiment the collet is of different material, such as cast iron or aluminum, than the hub and clamping ring, which are usually steel in order to prevent galling.

The cross section of the assembled hub locking device shown in FIG. 2, better illustrates the hub to endplate mounting details and the rear of the clamping ring. Hub 12 is seated in a bore 80 in the center of endplate 40 with flange 42 seated against the front of the endplate. The hub is held in place by a fillet weld 82.

The rear of clamping ring 14 is counter sunk at 84 to accommodate the lugs 30 and 32 of the collet. In addition, the rear of the ring is grooved at 86 to accept a compressable seal 88, such as a soft metal ring or O-ring.

Assembly includes inserting shaft 20 through aperture 44 in hub 12. Next, a key 90 is inserted in the keyway 92 in shaft 20, and collet 10 is placed over the shaft. As the collet is being slid onto the shaft, the collet is rotated with respect to the shaft, aligning keyway 28 with key 90 permitting the collet to be slid over the key and seated against the taper of aperture 44. Optional seal 88 can next be installed in groove 86 of clamping ring 14. After the shaft is rotated with respect to the pulley, aligning bores 50 and 52 with the bores in lugs 30 and 32 respectively, clamping ring 14 is placed over the shaft with bores 62 and 64 aligned with bore 50 and 52 respectively. Then the two mounting bolts 16 are inserted through bores 62 and 64, the bores in lugs 30 and 32 and threaded into bores 50 and 52. Finally, the mounting bolts are cinched down drawing clamping ring 14 toward hub 12, compressing collet 10 therebetween.

It will be seen that the collet is now compressingly engaging most of the circumference of the shaft therein, engaging aperture 44 at a plurality of points 94, which form a circle, and similarly engaging a circle of points 96 on aperture 60. Thus, lateral movement or creeping of the shaft with respect to the pulley is prevented. Rotational movement of the shaft with respect to the pulley is additionally prevented by engagement of key 90 with keyways 28 and 92 and lugs 30 and 32 engaging mounting bolts 16. Since the diameter of the bores in the lugs is greater than that of the bolts, the hub-locking device automatically compensates for misalignment of the keyways and inaccuracies in the installation of the hubs and endplates within the pulley.

The hub-locking device automatically compensates for angular misalignment of the shaft with respect to the hub. Such misalignment may occur, for example, because of misalignment of hub 12 in bore 80 or endplate 40 within the pulley. When such misalignment is present, collet 10 assumes a rotated position within apertures 44 and 60 during assembly. When mounting bolts 16 are tightened the collet locks as before, only along two different rings of points in apertures 44 and 60. No shaft bending torque will be introduced by the hub-locking device.

Thus, if hub 12 is mounted at the axis of the pulley and perpendicular thereto, shaft 20 will be coaxial with the pulley and no bending of the shaft, run out at the pulley face, vibration or fatigue will be introduced. Should hub 12 not be centered with respect to the pulley, or not be perpendicular to the axis of the pulley, run out will exist, but it will not be aggravated by bending of the shaft caused by the hub-locking device.

Because of the variety of pulley applications, certain minor modifications of the preferred embodiment are employed. For example, for smaller idler pulleys, neither lugs 30 and 32 nor keyway 28 are necessary. For different sized pulleys and shafts, the number of mounting bolts 16 and lugs 30 and 32 are varied in order to adequately grip the shaft. Also, although weld 82 is shown on the inside of endplate 40, it can alternatively be positioned on the outer surface thereof. Additionally, although the collet is shown as spherical in shape, it can also be slightly oval or ellipsoidal in shape.

Referring to FIG. 3, an alternative embodiment of the hub-locking device is shown generally to include a collet 100 on a shaft 102, a hub 104 mounted in a bore centered in a pulley endplate 106, and a clamping ring 108 attached to the hub by a plurality of mounting bolts 110. In this embodiment, both a bore 112 in the hub and a bore 114 in the clamping ring are generally spherical in shape, conforming to the contour of the collet. This provides an increased area of clamping engagement both between the hub and collet and between the clamping ring and collet.

The collet, in this embodiment, is so positioned within the hub, that an imaginary lane which bisects the endplate will pass through the center of the collet. Thus, if the hub is mounted along the pulley axis, even though it is mounted slightly cocked within the endplate or the endplate is cocked within the pulley, no run out at the pulley face will be introduced.

It is contemplated that after having read the proceeding disclosure certain other alterations and modifications of the present invention will no doubt become apparent to those skilled in the art. It is therefore intended that the following claims be interpreted to cover all such alterations and modifications as fall within the true spirit and scope of the invention.

What is claimed is:

1. A hub-locking device for use in coaxially mounting each end of a cylindrical pulley to a shaft comprising:
   a generally spherically-shaped collet having a centrally located shaft receiving bore, a longitudinally extending slot passing through one side of said collet permitting compression of said collet around the shaft, and at least one radially extending lug;
   a hub for attachment to an end of the cylindrical pulley to be mounted and having a first axially tapered bore for receiving one axial extremity of said collet, said hub having at least one bolt-receiving tapped bore formed therein;
   a clamping ring having a second axially tapered bore for receiving an opposite axial extremity of said collet, said ring having at least one bolt-receiving bore formed therethrough; and
   bolt means passing through said bolt-receiving bore in said clamping ring for threading into said tapped bore to draw said clamping ring towards said hub to compress said collet into locking engagement with the shaft passing therethrough, said bolts also being engaged by said lug to prevent rotation of said collet with respect to said hub.

2. A hub-locking device as recited in claim 1 wherein sufficient clearance exists between said lug and said bolt to compensate for inaccuracies in manufacturing.

3. A hub-locking device as recited in claim 1 wherein the threads in said bolt receiving tapped bore are of a locking type.

4. A hub-locking device as recited in claim 1 wherein said collet has an axially aligned keyway opening into said bore for receiving a key installed in a keyway in the shaft.

5. A hub-locking device as recited in claim 4 wherein said collet has a longitudinally extending groove in said bore facing said slot for relieving said slot.

6. A hub-locking device as recited in claim 1 wherein said first bore is generally spherically tapered.

7. A hub-locking device as recited in claim 1 wherein said second bore is generally spherically tapered.

8. A hub-locking device as recited in claim 7 wherein said first bore is generally spherically tapered.

* * * * *